(12) United States Patent
Lee et al.

(10) Patent No.: US 11,333,849 B2
(45) Date of Patent: May 17, 2022

(54) IMAGING LENS

(71) Applicant: LG INNOTEK CO., LTD., Seoul (KR)

(72) Inventors: Sang Hun Lee, Seoul (KR); Dae Sik Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 766 days.

(21) Appl. No.: 15/750,434

(22) PCT Filed: Aug. 2, 2016

(86) PCT No.: PCT/KR2016/008500
§ 371 (c)(1),
(2) Date: Feb. 5, 2018

(87) PCT Pub. No.: WO2017/023086
PCT Pub. Date: Feb. 9, 2017

(65) Prior Publication Data
US 2018/0224630 A1    Aug. 9, 2018

(30) Foreign Application Priority Data
Aug. 4, 2015  (KR) .......................... 10-2015-0110167

(51) Int. Cl.
*G02B 9/60* (2006.01)
*G02B 13/00* (2006.01)
(Continued)

(52) U.S. Cl.
CPC ........... *G02B 9/60* (2013.01); *G02B 13/0045* (2013.01); *G02B 13/18* (2013.01); *G02B 5/005* (2013.01)

(58) Field of Classification Search
CPC ...... G02B 9/60; G02B 13/0045; G02B 13/18; G02B 5/005
(Continued)

(56) References Cited

U.S. PATENT DOCUMENTS

2011/0176049 A1*  7/2011  Hsieh ................. G02B 13/0045
                                                          359/714
2012/0092778 A1*  4/2012  Tsai .................... G02B 13/0045
                                                          359/714
(Continued)

FOREIGN PATENT DOCUMENTS

JP    2012-113311 A    6/2012
JP    2013-011710 A    1/2013
(Continued)

OTHER PUBLICATIONS

International Search Report in International Application No. PCT/KR2016/008500, filed Aug. 2, 2016.

*Primary Examiner* — Marin Pichler
*Assistant Examiner* — Alberto J Betancourt
(74) *Attorney, Agent, or Firm* — Saliwanchik, Lloyd & Eisenschenk

(57) ABSTRACT

The present invention relates to an imaging lens and the present invention comprises: a first lens having a positive (+) refractive power; a second lens having a negative (−) refractive power; an iris (aperture); a third lens having a negative (−) refractive power; a fourth lens having a negative (−) refractive power; and a fifth lens having a positive (+) refractive power, wherein the first lens, the second lens, the third lens, the fourth lens and the fifth lens can be sequentially arranged along an optical axis from a subject side. Since the length of an optical system is shorter than a focal distance, the present invention can be effectively used for an imaging lens of an optical system requiring a low telephoto ratio.

15 Claims, 2 Drawing Sheets

(51) Int. Cl.
*G02B 13/18* (2006.01)
*G02B 5/00* (2006.01)

(58) Field of Classification Search
USPC ................................................. 359/713, 714
See application file for complete search history.

(56) References Cited

U.S. PATENT DOCUMENTS

| | | | |
|---|---|---|---|
| 2013/0314804 A1* | 11/2013 | Kubota | G02B 13/0045 359/757 |
| 2014/0218809 A1 | 8/2014 | Tsai et al. | |
| 2014/0340765 A1* | 11/2014 | Tsai | G02B 9/60 359/714 |
| 2016/0103300 A1* | 4/2016 | Tang | G02B 13/0045 359/713 |
| 2016/0187621 A1* | 6/2016 | Chen | G02B 9/62 348/335 |
| 2016/0187622 A1* | 6/2016 | Huang | G02B 13/0045 348/335 |
| 2016/0216495 A1* | 7/2016 | Sun | G02B 13/04 |
| 2016/0223791 A1* | 8/2016 | Hsieh | G02B 9/60 |
| 2016/0238821 A1* | 8/2016 | Liao | G02B 9/60 |
| 2016/0241756 A1* | 8/2016 | Chen | G02B 13/0045 |
| 2016/0259147 A1* | 9/2016 | Hsueh | G02B 9/60 |

FOREIGN PATENT DOCUMENTS

| | | |
|---|---|---|
| KR | 10-2013-0038631 A | 4/2013 |
| KR | 10-2014-0031787 A | 3/2014 |

* cited by examiner

IMAGING LENS

CROSS-REFERENCE TO RELATED APPLICATIONS

This application is the U.S. national stage application of International Patent Application No. PCT/KR2016/008500, filed Aug. 2, 2016, which claims priority to Korean Application No. 10-2015-0110167 filed Aug. 4, 2015, the disclosures of each of which are incorporated herein by reference in their entirety.

TECHNICAL FIELD

The teachings in accordance with exemplary and non-limiting embodiments of this invention relate generally to an imaging, and more particularly to an imaging lens used for a camera module.

BACKGROUND ART

In general, a focal length of an optical system is characteristically shorter than a focal distance (a distance from a lens surface of an object side of a first lens to an image sensor) of the optical system. Furthermore, demands are high on an optical lens having a lower telephoto ratio. Thus, development is direly required for an imaging lens where a focal length is longer than a distance of optical system to allow being applicable to an optical system of low telephoto ratio.

DETAILED DESCRIPTION OF THE INVENTION

Technical Subject

The present invention is provided to solve the abovementioned problems/disadvantages, and it is an object of exemplary embodiments of the present invention to provide an imaging lens applicable to an optical system requiring a low telephoto ratio.

Technical Solution

In one general aspect of the present invention, there is provided an imaging lens, comprising:
a first lens having a positive (+) refractive power; a second lens having a negative (−) refractive power; an iris (aperture); a third lens having a negative (−) refractive power; a fourth lens having a negative (−) refractive power; and a fifth lens having a positive (+) refractive power, wherein the first lens, the second lens, the third lens, the fourth lens and the fifth lens can be sequentially arranged along an optical axis from a subject side. Since the length of an optical system is shorter than a focal distance, the present invention can be effectively used for an imaging lens of an optical system requiring a low telephoto ratio.

Preferably, but not necessarily, at least one of the first to fifth lenses may include aspherical surface.

Preferably, but not necessarily, at least one of the first to fifth lenses may include an aspherical inflection point.

Preferably, but not necessarily, when a focal distance of the first lens is $f_1$, and an entire focal distance of the imaging lens is F, a conditional expression of $0.35<f_1/F<0.45$ can be satisfied.

Preferably, but not necessarily, when a distance from an incident surface of the first lens to an upper surface of the image senor is TTL, a conditional expression of $0.8<TTL/F<0.9$ can be satisfied.

Preferably, but not necessarily, when a refractive index at d line (d-line) of the third lens is $n_{3d}$, a conditional expression of $n_{3d}>1.6$ can be satisfied.

Preferably, but not necessarily, when an Abbe number of the third lens at d line (d-line) is $v_{3d}$, a conditional expression of $20<v_{3d}<30$ can be satisfied.

Preferably, but not necessarily, when a refractive power of second lens is $\varnothing_2$, a refractive power of third lens is $\varnothing_3$, and a refractive power of fourth lens is $\varnothing_4$, a conditional expression of $|\varnothing_2|>|\varnothing_4|>|\varnothing_3|$ can be satisfied.

Advantageous Effects

The present invention can be advantageously used for an imaging lens in an optical system requiring a low telephoto ratio because a focal length is smaller than a distance of the optical system.

BEST MODE

Figure 1:
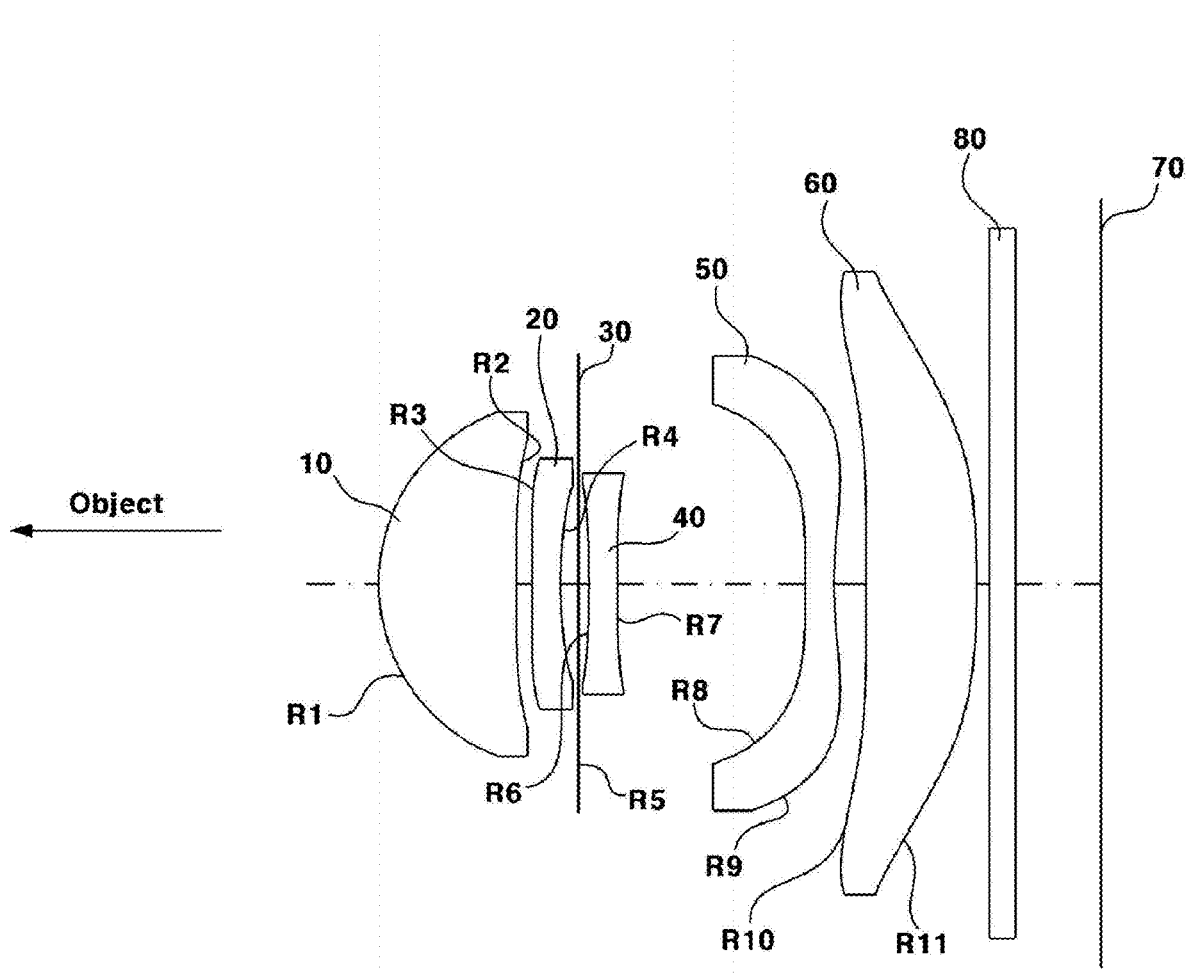
FIG. 1 is a schematic lateral cross-sectional view illustrating an arrangement structure of an imaging lens according to an exemplary embodiment of the present invention.
Figure 2:
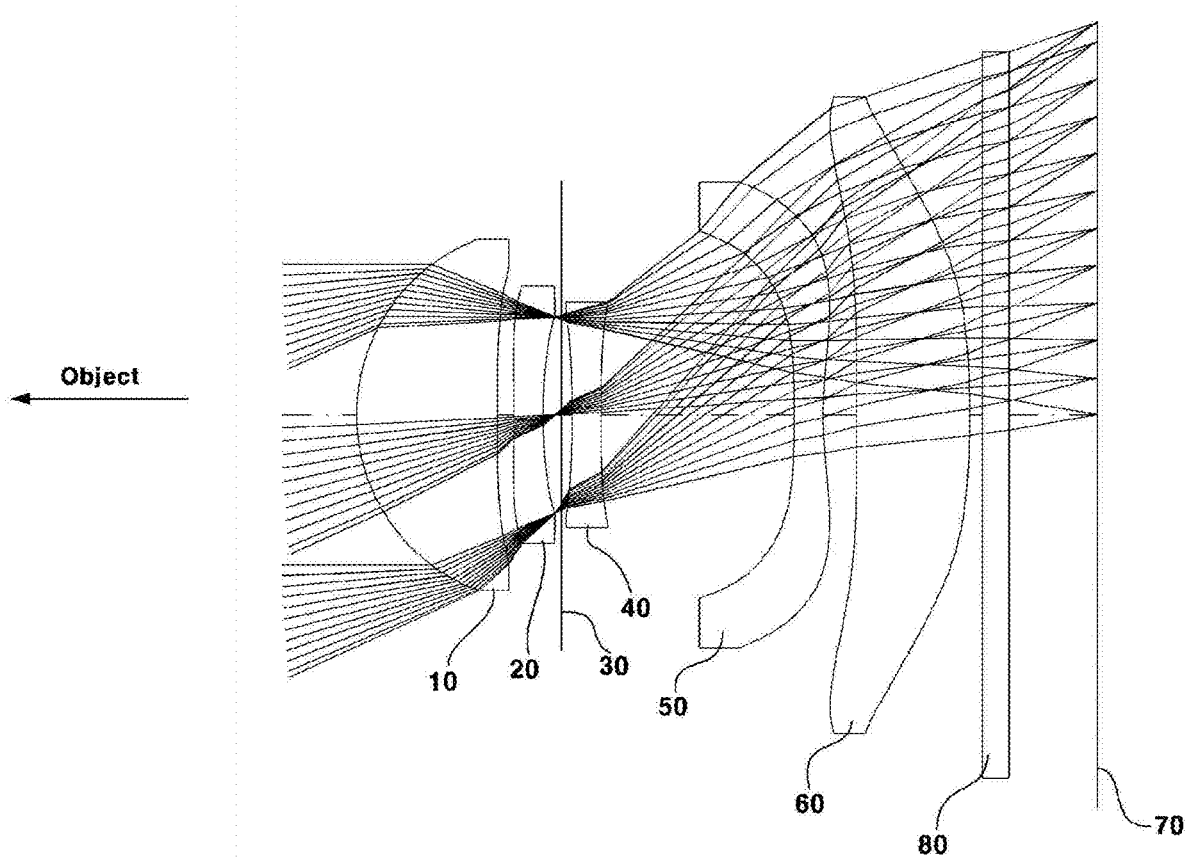
FIG. 2 is schematic lateral cross-sectional view illustrating a process of a light that passes an imaging lens of FIG. 1.

Hereinafter, some of exemplary embodiments of the present invention will be described with reference to the accompany drawings.

Throughout the descriptions, the same reference numerals will be assigned to the same elements in the explanations of the figures, even if shown in different drawings.

Detailed descriptions of well-known functions, configurations or constructions are omitted for brevity and clarity so as not to obscure the description of the present disclosure with unnecessary detail.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

Hereinafter, an arrangement structure of an imaging lens according to an exemplary embodiment of the present invention will be described with reference to the accompany drawings.

FIG. 1 is a schematic lateral cross-sectional view illustrating an arrangement structure of an imaging lens according to an exemplary embodiment of the present invention.

Referring to FIG. 1, the imaging lens according to an exemplary embodiment of the present invention may include, in the order of, or from a subject (object) side to a light receiving surface, a first lens (10), a second lens (20), an iris (aperture, 30), a third lens (40), a fourth lens (50), a fifth lens (60), and an image sensor (70). Furthermore, the imaging lens may further include a filter (80) between the fifth lens (60) and the image sensor (70). Thus, a light that parallels to image information of the subject may sequentially pass the first lens (10), the second lens (20), the iris (30), the third lens (40), the fourth lens (50) and the fifth lens, and may be incident on a light receiving surface.

In order to make it easy to realize the performance of imaging lens, the first lens and the second lens (10, 20) may constitute a first group based on the iris, the third to fifth lenses (40, 50, 60) may constituted a second group. All the second to fourth lenses (20, 40, 50) may have a negative refractive power (focal distance). The first lens (10) may have a relatively weak refractive power and the second lens (20) may increase a focal distance of the imaging lens to allow manufacturing a further optical lens, that is, an imaging lens having a low telephoto ratio. Furthermore, the third lens (40) may be disposed at a rear part of iris (30), that is, disposed at an image sensor (70) direction from the airs (30) to function to correct aberration of imaging lens.

Any one of the first to fifth lenses (10, 20, 40, 50, 60) may include an aspheric surface. Furthermore, any one of the first to fifth lenses (10, 20, 40, 50, 60) may include one or more aspheric inflection points.

The first lens (10) may have a positive (+) refractive power. The first lens (10) may be convex at a light incident surface (R1), that is, a lens surface of subject side may be convex to a subject side.

The second lens (20) may have a negative (−) refractive power. The second lens (20) may be concave at a light emitting surface (R4), that is, a lens surface of image sensor side may be concave to an image sensor direction side.

The third lens (40) may have a negative (−) refractive power. The third lens (40) may be concave at a light incident surface (R6) and a light emitting surface (R7), that is, a lens surface of subject side and a lens surface of image sensor direction are respectively concave to subject side and image sensor directions.

The fourth lens (50) may have a negative (−) refractive power. The fourth lens (50) may be such that a light incident surface (R8) and a light emitting surface (R9) are respectively of aspherical surface, that is, a lens surface of subject side and a lens surface of image sensor direction may be aspherical and the light emitting surface (R9) may be concave.

The fifth lens (60) may have a positive (+). The fifth lens may be such that a light incident surface (R10) and a light emitting surface (R11) are respectively of aspherical surface, that is, a lens surface of subject side and a lens surface of image sensor direction may be aspherical.

The filter (80) may be an UV (Ultraviolet) cut-off filter, whereby a radiant heat emitted from outside light may be inhibited from being transmitted to an image sensor (70).

TABLE 1

| | Lens surface | Radius of curvature (mm) | thickness(mm) | Refraction index(N) | Abbe number(V) |
|---|---|---|---|---|---|
| First lens | R1 | 1.471 | 1.116 | 1.531 | 557 |
| | R2 | 866.991 | 0.130 | | |
| Second lens | R3 | −13.684 | 0.230 | 1.65 | 21 |
| | R4 | 4.469 | 0.095 | | |
| iris | R5 | infinity | 0.132 | | |
| Third lens | R6 | −11.962 | 0.230 | 1.65 | 21 |
| | R7 | 21.056 | 1.524 | | |
| Fourth lens | R8 | −25.583 | 0.230 | 1.55 | 55 |
| | R9 | 3.308 | 0.262 | | |
| Fifth lens | R10 | 78.977 | 0.891 | 1.65 | 21 |
| | R11 | −10.414 | 0.1 | | |

The thickness in the above Table 1 indicates a distance from each lens surface to a next lens surface.

The imaging lens (optical system) according to an exemplary embodiment of the present invention may not be limited to values indicated in the Table 1 but may satisfy the following conditional expressions.

When a refraction index at d line (d-line) at the third lens (40) is $n_{3d}$, a conditional expression of $n_{3d} > 1.6$ can be satisfied. In general, a lens having a positive refractive power may be manufactured with a crown type material having a refractive index lower than 1.55. Furthermore, a lens having a negative refractive power may be manufactured with a flint type material having a refractive index higher than 1.55. The second lens (20) and the third lens (40) disposed relatively nearer to an iris according to an exemplary embodiment of the present invention may be manufactured with a flint type material having a negative refractive power. Furthermore, although the second lens (20) and the third lens (40) are easy in aberration correction, and if the second lens (20) or the third lens (40) have a refractive index ($n_{3d}$) with a value less than 1.6, it is difficult to perform a chromatic aberration correction in the exemplary embodiment of the present invention.

When an Abbe number at d line (d-line) of the third lens (40) is $v_{3d}$, a conditional expression of $20 < v_{3d} < 30$ can be satisfied. The third lens (40) is manufactured using with a flint type material as mentioned above, such that the Abbe number ($v_{3d}$) of third lens (40) may satisfy a scope of Abbe number of lens manufactured with flint type material. If the Abbe number ($v_{3d}$) of third lens (40) is deviated from the conditional expression of $20 < v_{3d} < 30$, it is difficult to perform the chromatic aberration correction according to the exemplary embodiment of the present invention.

When the refraction power of second lens is $\varnothing_2$, the refraction power of third lens is $\varnothing_3$, and the refraction power of fourth lens is $\varnothing_4$, a conditional expression of $|\varnothing_2| > |\varnothing_4| > |\varnothing_3|$ can be satisfied.

The following Table 2 indicates a Conic constant and a value of aspheric coefficient of a lens used for the imaging lens according to an exemplary embodiment of the present invention.

TABLE 2

| Lens surface | K | $A_1$ | $A_2$ | $A_3$ | $A_4$ | $A_5$ | $A_6$ |
|---|---|---|---|---|---|---|---|
| R1 | 0 | 0.00029 | −0.00437 | 0.00649 | −0.00387 | 0.00111 | 0 |
| R2 | 0 | 0.06477 | −0.00870 | −0.00596 | −0.00089 | 0.00320 | 0 |
| R3 | 0 | 0.11047 | −0.03056 | 0.00741 | −0.01293 | 0.02029 | 0 |
| R4 | 0 | 0.03578 | 0.08699 | −0.14787 | 0.14224 | 0 | 0 |
| R6 | 0 | −0.06194 | 0.05486 | −0.02653 | −0.07051 | 0 | 0 |
| R7 | 0 | 0.02342 | 0.09845 | −0.010896 | 0.07042 | −0.02485 | 0 |
| R8 | −90 | −0.14409 | −0.00478 | 0.01527 | −0.00573 | −0.00010 | −0.0006 |
| R9 | −0.41323 | −0.13203 | 0.02677 | −0.00605 | 0.00047 | −0.00009 | 0 |
| R10 | 90 | −0.02391 | 0.00059 | 0.00105 | −0.00014 | 0 | 0 |
| R11 | 8.031911 | −0.04938 | 0.00557 | 0.00127 | −0.00026 | 0 | 0 |

The value of aspheric constant (coefficient) in Table 2 may be obtained from the following Equation 1.

$$z = \frac{CY^2}{1+\{1-(1+K)(C^2Y^2)\}} + (A_1)Y^4 + (A_2)Y^6 + (A_3)Y^8 + (A_4)Y^{10} + (A_5)Y^{12} + (A_6)Y^{14}$$ Equation 1 z: distance from vertex of lens to optical axis direction
C: basic curvature of lens
Y: distance to a direction perpendicular optical axis
K: Conic Constant
$A_1, A_2, A_3, A_4, A_5, A_6$: Aspheric Constant A focal distance (f) of entire optical system of imaging lens according to an exemplary embodiment of the present invention, and a distance (TTL) from incident surface (R1) of first lens (10) to an upper surface are shown in the following Table 3.

TABLE 3

| | |
|---|---|
| Focal distance (F) of optical system | 6.83 mm |
| Focal distance ($f_1$) of first lens | 2.764 mm |
| Focal distance ($f_2$) of second lens | −5.106 mm |
| Focal distance ($f_3$) of third lens | −11.589 mm |
| Focal distance ($f_4$) of fourth lens | −5.293 mm |
| Focal distance ($f_5$) of fifth lens | 14.072 mm |
| Distance (TTL) from incident surface (R1) of first lens to an upper surface | 5.88 mm |
| $f_1$/TTL | 0.470068 |
| $f_2$/TTL | −0.868367 |
| $f_3$/TTL | −1.970918 |
| $f_4$/TTL | −0.900170 |
| $f_5$/TTL | 2.391973 |

The focal distance of imaging lens according to an exemplary embodiment of the present invention is not limited to the values indicated in the above Table 3, and may satisfy the following conditions.

When a focal distance of first lens (10) is $f_1$, and an entire focal distance of imaging lens is F, a conditional expression of $0.35 < f_1/F < 0.45$ can be satisfied.

In order to implement a realization of a module smaller than an imaging lens, the first lens (10) may require a shorter focal distance, and therefore the first lens (10) is such that a radius of curvature at the incident surface (R1) must be smaller than a radius of curvature at a light emitting surface (R2).

However, when $f_1$/F of first lens (10) has a value less than 0.35, a distance from the incident surface of first lens (10) to the light emitting surface, that is, a thickness, is farther lengthened, whereby the focal distance ($f_1$) of first lens (10) is reduced when an entire focal distance (F) of imaging lens is constant at a predetermined value to make it difficult to manufacture an imaging lens, and when $f_1$/F of incident surface (R1) of first lens (10) has a value more than 0.45, the focal distance ($f_1$) of first lens (10) is farther lengthened to make it difficult to realize the performance of an imaging lens according to an exemplary embodiment of the present invention.

When a distance from incident surface (R1) of first lens (10) to an upper surface of the imaging sensor (70) is TTL, and an entire focal distance of imaging lens is F, a conditional expression of $0.8 < TTL/F < 0.9$ can be satisfied, which shows a ratio between a distance from incident surface (R1) of first lens (10) to an upper surface of the imaging sensor (70) and an entire focal distance (F) of imaging lens, and when the entire focal distance (F) of imaging lens is lengthened or when the distance (TTL) from incident surface (R1) to an upper surface of the imaging sensor (70) is reduced, a narrow field of view (angle of view) and telephoto effect can be obtained.

However, when TTL/F has a value less than 0.8, it is difficult to realize the performance of imaging lens. Furthermore, when the entire focal distance (F) of imaging lens is reduced, or the distance (TTL) from incident surface (R1) to an upper surface of the imaging sensor (70) is lengthened, the thickness of lens alignment for the imaging lens according to the exemplary embodiment of the present invention is increased, such that when TTL/F has a value more than 0.9, the telephoto ratio may be also increased to disallow being of optical purpose.

Although the abovementioned explanation is exemplary embodiments to implement an imaging lens according to the present invention, the present invention is not limited thereto. Thereby, it should be appreciated by the skilled in the art that changes, modifications and amendments to the above examples may be made without deviating from the scope of protection of the invention.

The invention claimed is:
1. An imaging lens, comprising:
a first lens having a positive (+) refractive power;
a second lens having a negative (−) refractive power;
an iris;
a third lens having a negative (−) refractive power;
a fourth lens having a negative (−) refractive power;
a fifth lens having a positive (+) refractive power;
a filter; and
an image sensor; wherein
the first lens, the second lens, the third lens, the fourth lens, the fifth lens, the filter, and the image sensor are sequentially arranged along an optical axis from a subject side;
wherein the iris is interposed between the second lens and the third lens and spaced apart from the second lens and the third lens, wherein, when a refractive power of second lens is Ø2, a refractive power of third lens is Ø3, and a refractive power of fourth lens is Ø4, a conditional expression of |Ø2|>|Ø4|>|Ø3| is satisfied, wherein when a distance from an incident surface of the first lens to an upper surface of the image sensor is TTL, a conditional expression of 0.8<TTL/F<0.9 is satisfied, and wherein the fourth lens comprises a light incident surface and a light emitting surface, the light incident surface having a portion that is a concave aspherical surface and the light emitting surface having a paraxial portion that is a concave aspherical surface and two distal portions each of which is convexly formed.

2. The imaging lens of claim 1, wherein at least one of the first to fifth lenses includes an aspherical surface.

3. The imaging lens of claim 1, wherein at least one of the first to fifth lenses includes an aspherical inflection point.

4. The imaging lens of claim 1, wherein when a focal distance of the first lens is $f_1$, and an entire focal distance of the imaging lens is F, a conditional expression of $0.35<f_1/F<0.45$ is satisfied.

5. The imaging lens of claim 4, wherein a radius of curvature of an incident surface of the first lens is formed to be smaller than a radius of curvature of a light emitting surface of the first lens.

6. The imaging lens of claim 1, wherein, when a refractive index at d line (d-line) of the third lens is $n_{3d}$, a conditional expression of $n_{3d}>1.6$ is satisfied.

7. The imaging lens of claim 1, wherein, when an Abbe number of the third lens at d line (d-line) is $v_{3d}$, a conditional expression of $20<v_{3d}<30$ is satisfied.

8. The imaging lens of claim 1, wherein the first lens is convexly formed at a lens surface of the subject side toward a subject side.

9. The imaging lens of claim 1, wherein the second lens is concavely formed at a lens surface of a light emitting surface from which a light is emitted toward a light emitting direction.

10. The imaging lens of claim 1, wherein the third lens is concavely formed at a light incident surface and a light emitting surface.

11. The imaging lens of claim 1, wherein the fifth lens is aspheric at a light incident surface and a light emitting surface.

12. The imaging lens of claim 1, wherein the second lens and the third lens are made of flint material.

13. The imaging lens of claim 1, wherein a distance between the third lens and the fourth lens is largest among distances between adjacent lenses of the first to fifth lenses.

14. An imaging lens, comprising:
a first lens having a positive (+) refractive power;
a second lens having a negative (−) refractive power;
an iris (aperture);
a third lens having a negative (−) refractive power;
a fourth lens having a negative (−) refractive power;
a fifth lens having a positive (+) refractive power;
a filter; and
an image sensor, wherein the first lens, the second lens, the iris, the third lens, the fourth lens, the fifth lens, the filter, and the image senor are sequentially arranged in that order along an optical axis from a subject side;

wherein the iris is interposed between the second lens and the third lens and spaced apart from the second lens and the third lens, wherein, when a refractive power of second lens is Ø2, a refractive power of third lens is Ø3, and a refractive power of fourth lens is Ø4, a conditional expression of |Ø2|>|Ø4|>|Ø3Ø is satisfied, wherein when a distance from an incident surface of the first lens to an upper surface of the image sensor is TTL, a conditional expression of 0.8<TTL/F<0.9 is satisfied, wherein the fourth lens comprises a light incident surface and a light emitting surface, the light incident surface having a portion that is a concave aspherical surface and the light emitting surface having a paraxial portion that is a concave aspherical surface and two distal portions each of which is convexly formed.

15. An imaging lens, comprising:
a first lens convexly formed at a lens surface of a subject side;
a second lens concavely formed at a light emitting surface from which a light is emitted;
an iris (aperture);
a third lens concavely formed at an incident surface and a light emitting surface;
a fourth lens concavely formed at a light emitting surface;
a fifth lens aspherically formed at an incident surface and a light emitting surface;
a filter; and
an image sensor, wherein the first lens, the second lens, the iris, the third lens, the fourth lens, the fifth lens, the filter and the image sensor are sequentially arranged in that order along an optical axis from a subject side;

wherein the iris is interposed between the second lens and the third lens and spaced apart from the second lens and the third lens, wherein, when a refractive power of second lens is Ø2, a refractive power of third lens is Ø3, and a refractive power of fourth lens is Ø4, a conditional expression of |Ø2|>|Ø4|>|Ø3 is satisfied, wherein when a distance from an incident surface of the first lens to an upper surface of the image sensor is TTL, a conditional expression of 0.8<TTL/F<0.9 is satisfied, and wherein the fourth lens comprises a light incident surface and a light emitting surface, the light incident surface having a portion that is a concave aspherical surface and the light emitting surface having a paraxial portion that is a concave aspherical surface and two distal portions each of which is convexly formed.

* * * * *